United States Patent [19]

Woloshuk et al.

[11] 4,435,053
[45] Mar. 6, 1984

[54] THREE-DIMENSIONAL PLURAL DISPLAY APPARATUS

[75] Inventors: Edward A. Woloshuk, New York, N.Y.; Gregory J. Walz, Pittsburgh, Pa.

[73] Assignee: The Zyntrax Corporation, Montauk, N.Y.

[21] Appl. No.: 437,101

[22] PCT Filed: Oct. 8, 1980

[86] PCT No.: PCT/US82/01370
§ 371 Date: Jun. 16, 1982
§ 102(e) Date: Jun. 16, 1982

[87] PCT Pub. No.: WO82/01259
PCT Pub. Date: Apr. 15, 1982

[51] Int. Cl.³ .............................................. G03B 21/32
[52] U.S. Cl. ...................................... 352/86; 352/43; 352/85; 352/123
[58] Field of Search ................. 352/86, 85, 43, 72, 352/123

[56] References Cited

U.S. PATENT DOCUMENTS

| | | | |
|---|---|---|---|
| 3,077,816 | 2/1963 | Hirsch | 352/86 |
| 3,262,357 | 7/1966 | Warzynski et al. | 352/123 |
| 3,428,393 | 2/1969 | Montebello | 352/43 |
| 3,454,333 | 7/1969 | Wells | 352/72 |
| 3,462,213 | 8/1969 | Montebello | 352/86 |

*Primary Examiner*—Monroe H. Hayes

[57] ABSTRACT

This apparatus forms and displays sequentially a plurality of three-dimensional images. Frames from a film strip are stroboscopically selected and projected on a moving screen. The effect may be simply a comparison of two three-dimensional images. Alternatively, an illusion of motion of a three-dimensional image may be created. Safety features prevent access to rotating parts and other features protect the stroboscope from excessive and unnecessary use. A single three-dimensional image may be selected and continuously projected on the screen.

14 Claims, 23 Drawing Figures

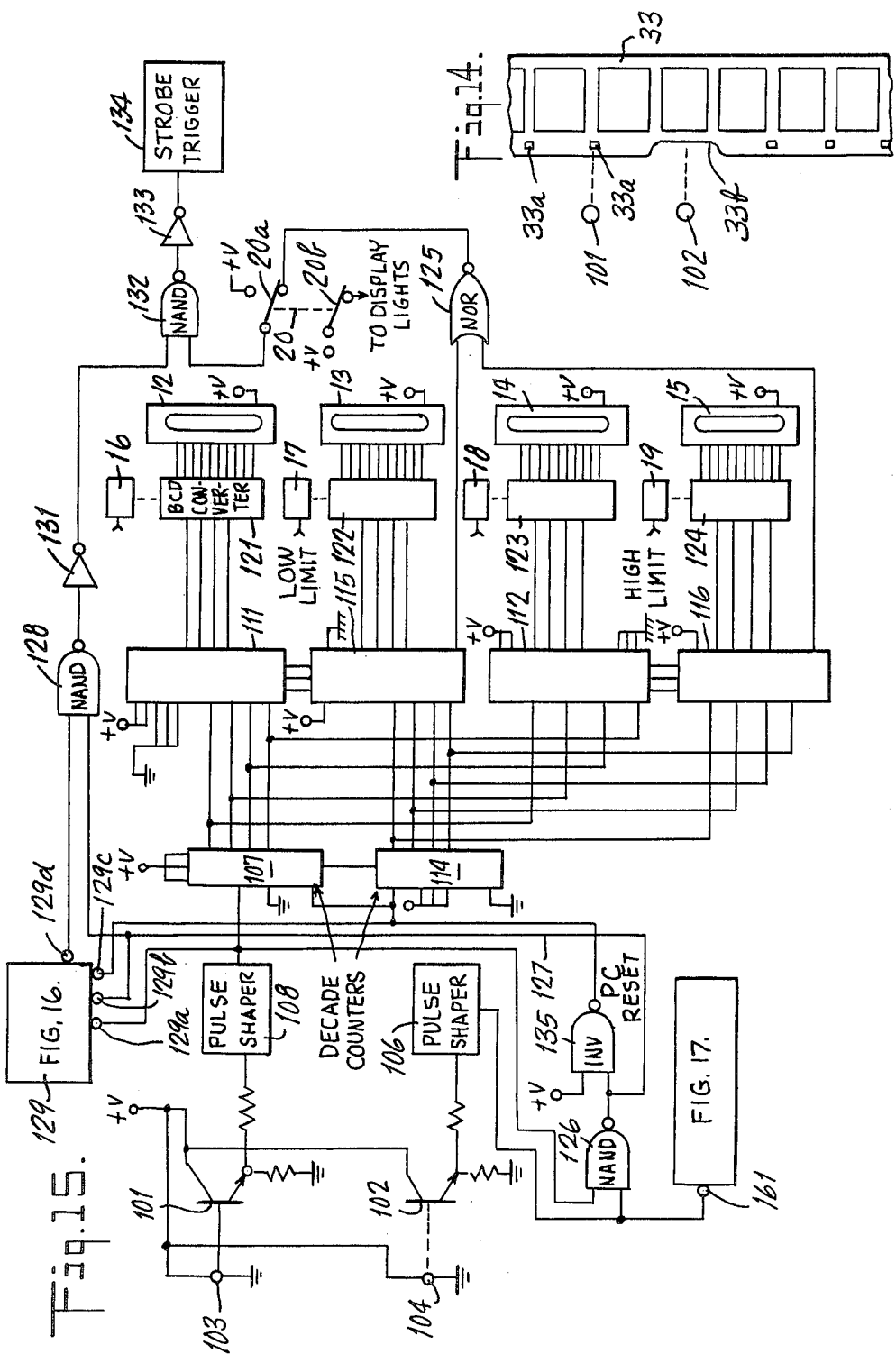

THREE-DIMENSIONAL PLURAL DISPLAY APPARATUS

CROSS-REFERENCES

This invention is an improvement on the inventions disclosed in the U.S. patents to de Montebello, No. 3,428,393 and No. 3,462,313, and in the copending U.S. application of Edward A. Woloshuk et al., Ser. No. 86,383, filed Oct. 19, 1979, all of which are incorporated herein by reference.

BRIEF SUMMARY OF THE INVENTION

The apparatus of the de Montebello patents identified above utilize a film strip comprising successive cross-sectional views of an object. The frames of the film strip are arranged in the order corresponding to the relationship of the successive cross-section. The film strip is moved through an optical system in which the frames are successively stroboscopically illuminated, one at a time, and the images produced by that illumination are projected on a rotating screen of spiral cross-section, rotatable about the axis of the spiral. In a modification, the screen is made up of segments of part-cylindrical contour, rotatable about an axis eccentric with respect to the axes of those contours. An observer of the rotating screen having persistence of vision sees all of the images projected into a three-dimensional space and thus gets a view of a transparent solid showing the internal structure of the object. The apparatus in de Montebello U.S. Pat. No. 3,428,393 masks out part of the images along a plane perpendicular to the planes of the successive photographs in a series, so that a cross-sectional image can be produced which is taken along a selected plane perpendicular to the planes of the original photographs.

The apparatus of the Woloshuk et al. application has the further capability of displaying a two-dimensional image taken along the plane of any selected original photograph. It can alternatively display a three-dimensional image cut along a selected plane at either or both ends of the stack of original cross-sectional views.

The present invention improves the apparatus of the de Montebello patents and of the Woloshuk et al. application by providing for a comparison of two or more successively presented three-dimensional images. In its simplest form, the apparatus presents two three-dimensional images alternately, so that the observer can make visual comparison of the two images. For example, the two images may be of a part of the human body in different positions. The extremes of movement of a ventricle and of the expansion of human lungs are illustrated. More complex forms of the present invention, using more than two three-dimensional images, can be employed so as to give an effect of animation, similar to that obtained in a two-dimensional moving picture, but with all three dimensions visible. Alternatively, a section taken along any of the three dimensions may be selected for presentation.

The cross-sectional views representing one of two images in the proper sequence are placed in a predetermined set of locations on the strip. The cross-sectional views representing the other image are placed in a different predetermined set of locations on the strip. The strip is placed on an endless carrier such as a transparent drum or belt, by which it is moved repeatedly through the optical system. The flashing of the stroboscope lamp is controlled to select one set of images or the other. One set of images is illuminated for several cycles of rotation of the film strip, and the illumination is then switched to the other set of images. The two sets of images are illuminated alternately, although the alternation may be stopped to allow continuous presentation of one image. If more than two sets of images are used, they may be illuminated in a predetermined repeated sequence, to present an appearance of motion. Again, the sequence may be stopped to present one image continuously.

DRAWINGS

FIG. 14 is a fragmentary view of a film strip used in connection with the invention.

FIG. 15 is a wiring diagram of a stroboscope trigger control circuit used in the invention.

FIG. 18 is a wiring diagram of a power supply circuit.

DETAILED DESCRIPTION

FIGS. 1-5 AND 20

Figure 1:
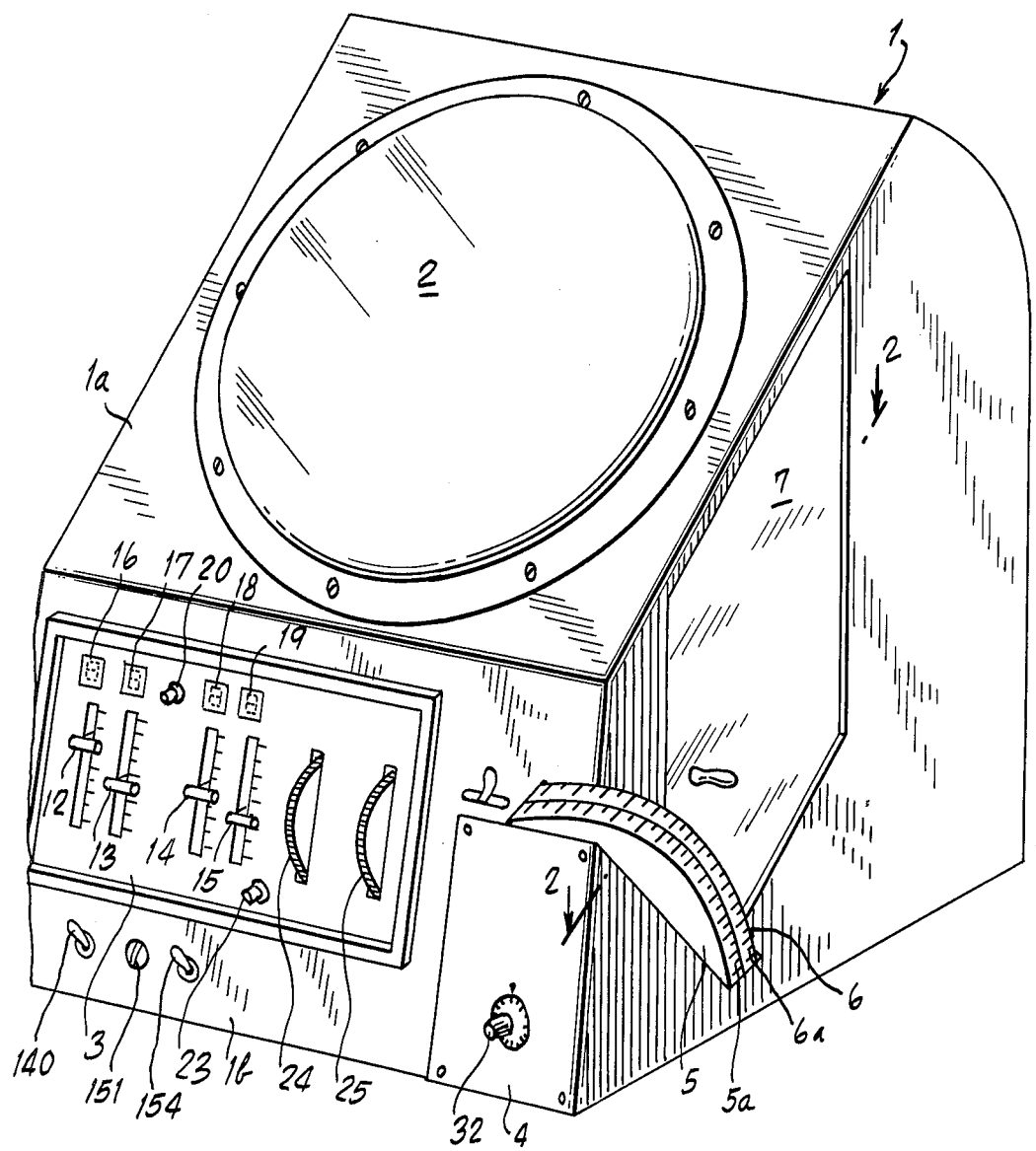
FIG. 1 is a perspective external view of an apparatus embodying the invention.

FIG. 1 illustrates the external appearance of the apparatus and includes a casing generally indicated at 1, having a forwardly facing slanted upper surface 1a on which there is centrally mounted a transparent dome 2 through which the three-dimensional display is to be observed. The front wall 1b of the casing below the slanting surface 1a includes a main control panel 3 and an auxiliary control panel 4. Projecting from the right-hand side of the surface 1b of casing 1 are a pair of cooperating rotatable discs 5 and 6 having respective scales 5a and 6a marked on their surfaces. A slidable door 7, shown in its closed position, is movable rearwardly to give access to the interior of the casing 1. The door 7 actuates a switch 8 (FIG. 2) when it is moved away from its closed position. The inside of the door 7 carries a bar 9 which engages a locking pin 10 when the door is opened a very short distance which is too small for a hand to enter through the door. The locking pin 10 may be withdrawn by energization of a solenoid 11.

The main control panel 3 includes a frame selector activating switch 20 and four frame selector switches 12, 13, 14 and 15. Each switch includes an operating handle moving along a slot adjacent a fixed scale. Digital indicators 16, 17, 18, 19 are provided above the reflective switches 12, 13, 14 and 15. These switches select from a film strip particular photographs to be displayed, by means of apparatus described below and illustrated in FIGS. 14–18.

A master switch 23 controls the supply of power to the entire apparatus. A knurled thumb wheel 24 controls a Dove prism 65 (FIG. 2) for rotating the image under the dome 2. Another knurled thumb wheel 25 controls a zoom lens 64 which may be used to magnify the image appearing under the dome 2. A rotatable knob 32 controls the horizontal framing of the image by movement of photosensors 101 and 102 (see FIG. 5).

The discs 5 and 6 normally rotate independently, the disc 5 being held stationary by a brake. When the brake is released, it is possible to rotate the disc 5, either along or together with the disc 6.

Figure 2:
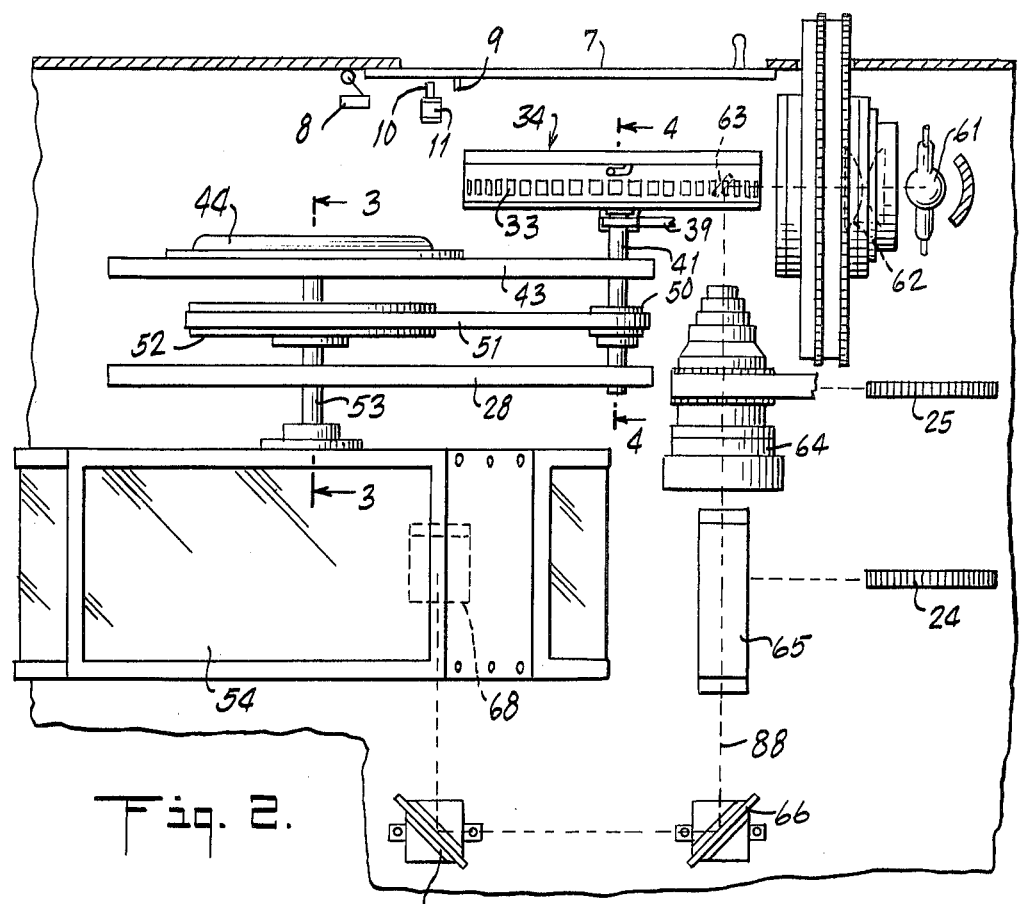
FIG. 2 is a fragmentary cross-sectional view taken along the lines 2—2 of FIG. 1.
Figure 3:
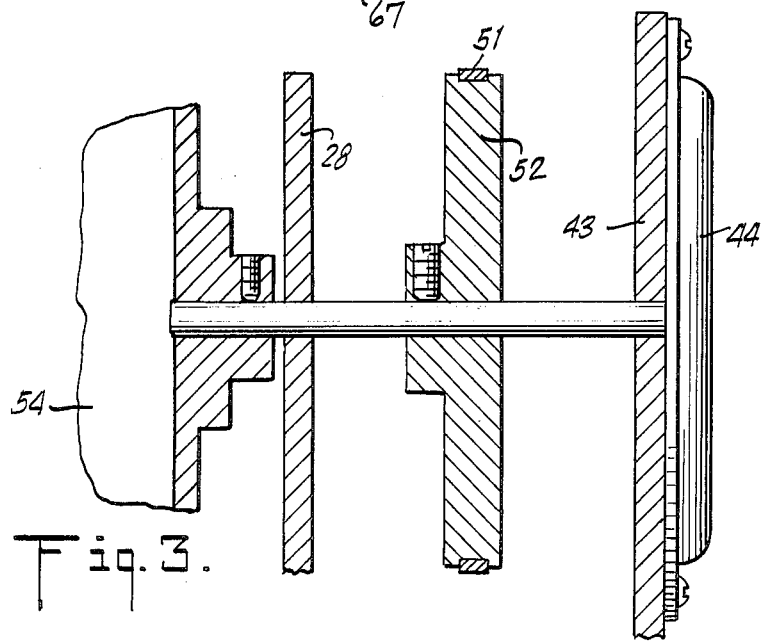
FIG. 3 is a fragmentary cross-sectional view taken on the line 3—3 of FIG. 2.
Figure 4:
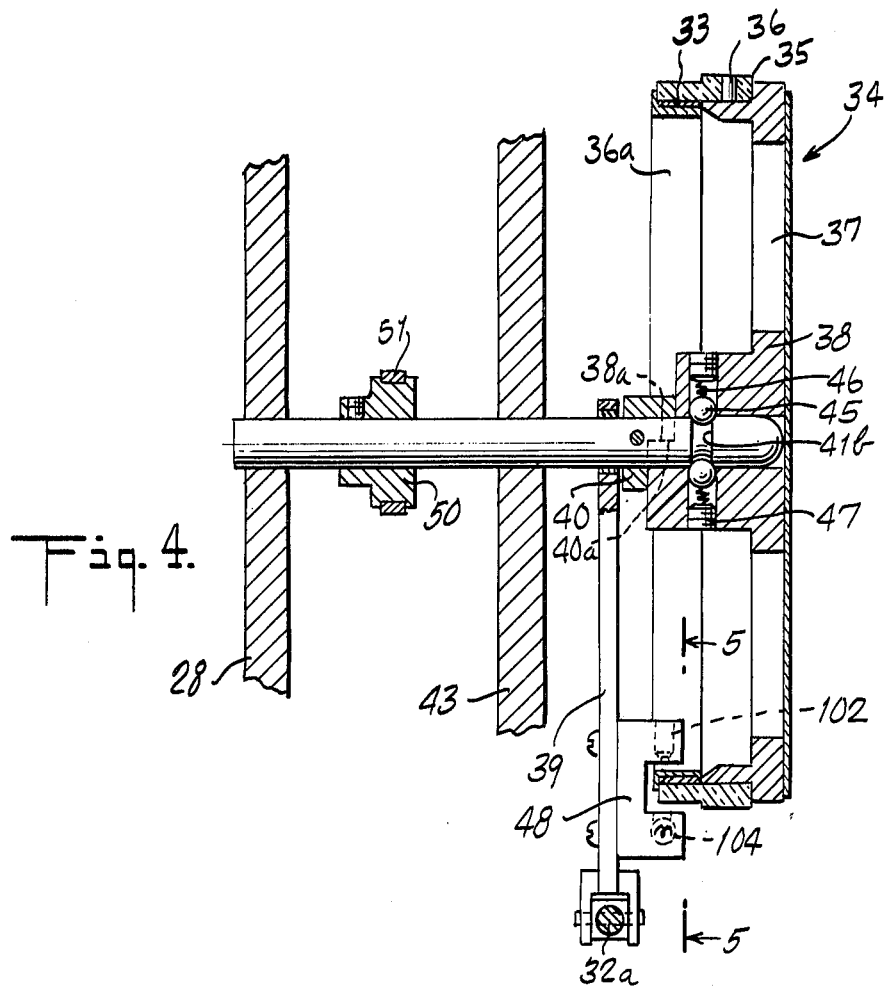
FIG. 4 is a fragmentary cross-sectional view on the line 4—4 of FIG. 2.

FIGS. 2 and 3 illustrate the principal mechanical parts of the apparatus and their relation to the casing 1 illustrated in FIG. 1. A film strip 33 (FIGS. 2 and 4) is mounted in a film holder 34 comprising a transparent hollow drum 35 at the inner surface of that drum. A transparent locking ring 36a of substantially thinner material than the drum 35 may be moved into the drum after the film is in place and thereafter expanded and locked to hold the film in place. The drum 35 is provided with curved slots (not shown) cooperating with pins 36 on a wheel 37 fixed on a hub 38. The pins 36 and slots form a bayonet joint. The drum 35 may alternatively be provided with apertures which can receive spring loaded balls mounted on the wheel 37 in place of the pins 36.

The hub 38 is provided with a step 38a at one end to cooperate with a step 40a on a hub 40 fixed on a shaft 41 for rotation therewith. (See FIG. 4). The shaft is supported by a plate 28 and a plate 43. The plate 43 also serves as a mount and a heat sink for a motor 44 (See FIG. 2).

The hub 38 is apertured to receive a pair of balls 45, which are biased by springs 46 held in place by threaded retainers 47. The balls 45 cooperate with a groove 41b in the shaft 41, and releasably lock the hub 38 to the shaft 41, so that the hub 38 and the film holder 34 mounted thereon can be readily removed as a unit from the shaft 41.

A pulley 50 is fixed on the shaft 41. Over the pulley 50 runs a belt 51. The belt 51 runs over another pulley 52 fixed on a shaft 53 driven by the motor 44. The belt 51 and the pulleys 50 and 52 are provided with mating teeth, so that there can be no slippage between the film wheel 37 and the shaft 53.

Rotatably mounted on the shaft 41 is an arm 39, which projects downwardly and carries near its lower end a U-shaped block 48 which supports a pair of photocells 101 and 102, inside the film holder 34, and a pair of lamps 103 and 104 located outside the film holder 34 for energizing these photocells. The lower end of arm 39 is connected by a joint 49 to a flexible shaft 32a connected to the framer control knob 32 at the front of the casing 1. The shaft 32a has at its end a screw member which cooperates with the joint 49 so that the arm 39 may be rotated through a limited excursion about the shaft 41.

Figure 20:
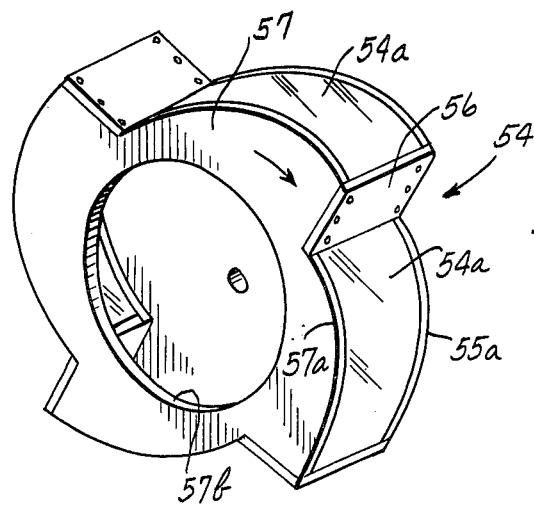
FIG. 20 is a perspective view of a rotating screen in the apparatus of FIGS. 1-5.

The shaft 53 has fixed thereon a projection screen 54, best seen in FIG. 20, and comprising four projecting screen segments 54a of arcuate cross-section, each extending through an angle of about 90° with respect to the axis of the screen 54. The screen 54 comprises two discs 55 and 57 which hold the four screen segments 54a in fixed relation to each other. The disc 55 is fixed on the shaft 53. Each disc 55 and 57 has four arcuate quadrants 55a and 57a which mate with and hold the arcuate screen segments 54a. Attached to the end of each arcuate quadrant 55a is a plate 56 which extends axially and is attached at its other end to the corresponding arcuate quadrant 57a of disc 57. The disc 57 has a central aperture 57b.

Light from a stroboscopic lamp 61 is projected along an optical path 88 best seen in FIG. 2. Beginning at lamp 61, the optical path may be traced through a pair of condensing lenses 62, and then passes through the transparent drum 35 and a frame of the film strip 33. The light is then reflected by a reflector 63 through zoom lens 64 and prism 65 to reflectors 66 and 67 to a final reflector 68 located near the central axis of the screen 54. Reflector 68 is located slightly to the right of that axis, as shown in FIG. 2. The centerline of the reflector is in a plane through that axis, which plane is generally parallel to the outer portions of the rotating screen segments 54a, as they pass under the dome 2. From the reflector 68, the image is projected directly onto a segment 54a of the screen 54. The reflector 68 is mounted on a bracket (not shown) which is mounted on the base of the casing 1 and extends through the aperture 57b in the center of the plate 57. The reflectors 63, 66, 67, 68 may be coated with a high reflecting coating (HR) deposited thereon by sputtering or vapor deposition, and which reflects 95–98% of the light received on each surface.

The film holder 34 (FIG. 4) is rotated at a speed four times the speed of the screen drum 54, so that the entire film strip mounted on the holder 34 is projected onto each screen segment 54a. The screen drum 54 rotates clockwise as viewed in FIG. 20 so that the first frame projected on a screen 54a is viewed at the outer end or maximum radius portion of that screen. The subsequent frames of the film are projected on the screen at locations of successively decreasing radii with respect to the axis of rotation. Thus, after each flash of the lamp 61 resulting in a projection of an image, the screen recedes slightly from the observer's eye before the next frame is projected on the screen. The three-dimensional effect is dependent on the persistence of vision in the observer's eye. By moving the screen away from the observer after each projected image, the screen does not appear to intervent between the persisting images and the new images.

The dome 2 which provides a 360° view of the image projected may be tinted slightly with, for example, a gray tint and the screen segments 54a may be given a similar gray tint. With such an arrangement, the contrast between the projected images and the background is increased, so that the projected images are more readily visible to the observer. In the casing 1, should be mounted at least two cooling fans (not shown) to provide proper cooling for the lamp 61 and motor 44 described above.

FIGS. 6–8

Figure 7:
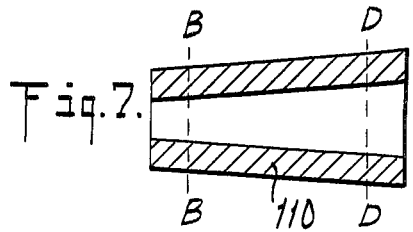
FIG. 7 shows a longitudinal cross-sectional view of the same ventricle in the open position.
Figure 6:
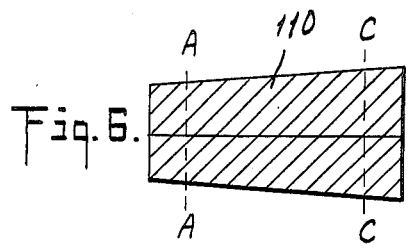
FIG. 6 shows a longitudinal cross-sectional view of a ventricle of a human heart in closed position.
Figure 8:
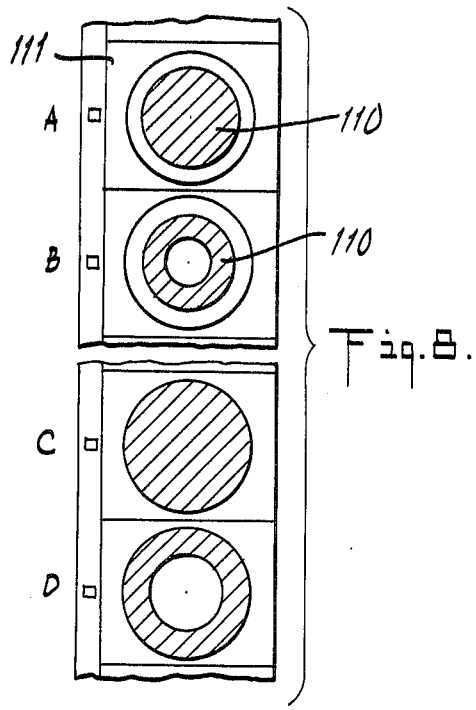
FIG. 8 shows a film strip, with a section broken away, constructed by making cross-sectional X-ray views taken along the lines AA, BB, CC and DD of FIGS. 6 and 7 and arranging them in the positions illustrated.

FIGS. 6 and 7 illustrate a ventricle of a human heart, in closed position in FIG. 6 and in open position in FIG. 7. FIG. 8 illustrates a film strip 111 made up of successive cross-sections through the ventricle of FIGS. 6 and 7. In producing any practical film strip, there would be a large number of cross-sections taken through the ventricle at different successive locations. To simplify the illustration, only two locations are selected, one at each end of the ventricle. The cross-section AA is taken near the narrow end of the closed ventricle and the cross-section BB is taken near the narrow end of the open ventricle. Cross-section CC is taken near the wide end of the closed ventricle and cross-section DD is taken near the wide end of the open ventricle. The film strip 111 is shown as a fragment consisting of four frames. Frame A is taken at the cross-section AA in FIG. 6; frame B is taken at the cross-section BB in FIG. 7. After a break in the film indicating where the intervening cross-sections would appear in the completed film strip, there appears a frame C taken at the cross-section CC in FIG. 6 and a frame D taken at the cross-section DD in FIG. 7.

FIGS. 9–11

Figure 9:
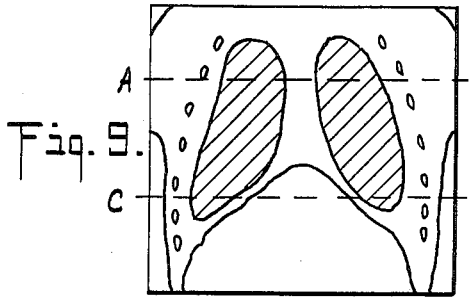
FIG. 9 shows a cross-sectional X-ray view of a human chest with the lungs contracted.
Figure 10:
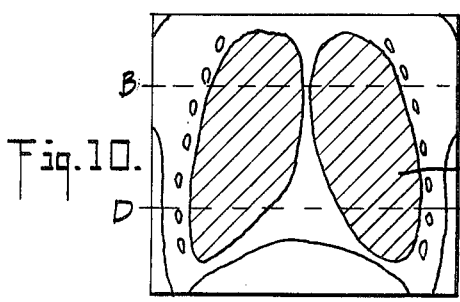
FIG. 10 shows a similar view of the same chest with the lungs expanded.
Figure 11:
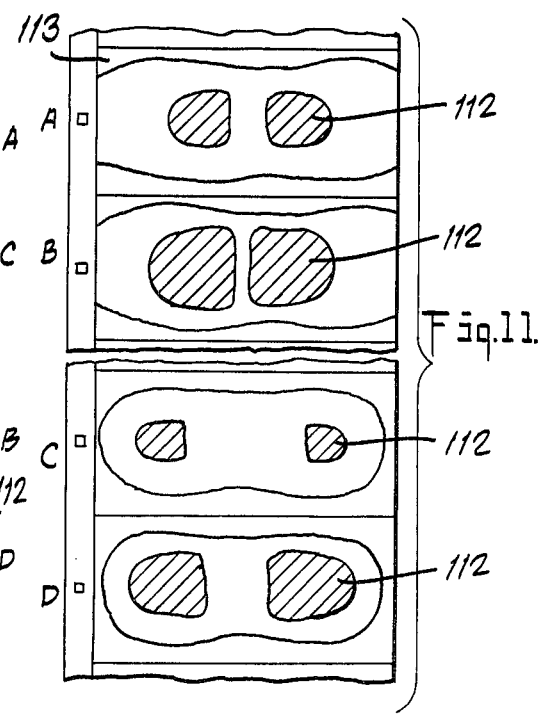
FIG. 11 shows a film strip constructed by making cross-sectional views on the lines AA, BB, CC and DD of FIGS. 9 and 10, and arranging them in the positions illustrated.
Figure 12A:
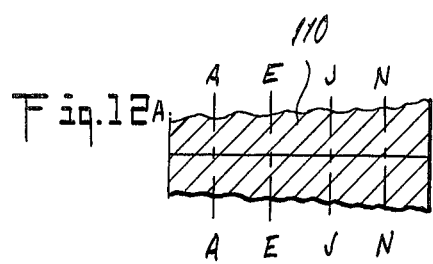
FIGS. 12A, 12B, 12C and 12D show four successive longitudinal sectional views of a ventricle in a human heart, as that ventricle moves from the closed position shown in FIG. 12A to the open position in FIG. 12D.
Figure 12B:
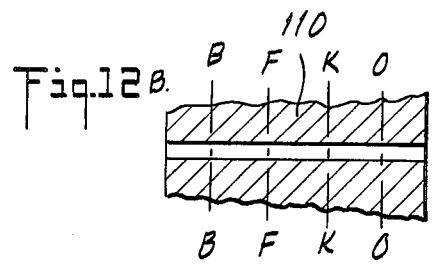
Figure 12C:
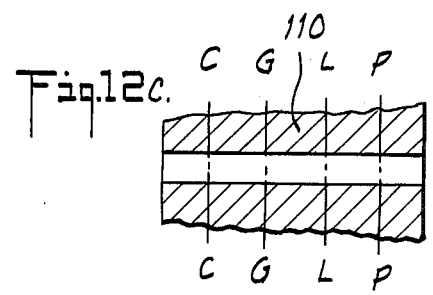
Figure 12D:
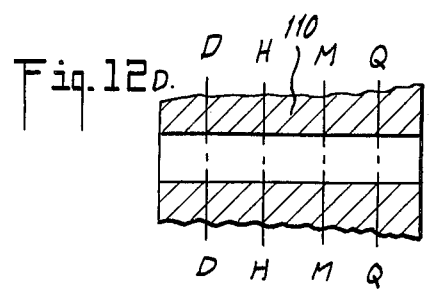

FIGS. 9 and 10 illustrate a pair of human lungs in the contracted and expanded positions, respectively. FIG. 11 shows a film strip 113 illustrating the manner in which the cross-sections taken on the lines AA, BB, CC and DD of FIGS. 9 and 10 are assembled in the film strip 113.

In FIG. 9, the cross-section AA is taken near the upper end of the lung with the lungs contracted. The section BB is taken on the same plane, which appears as BB in FIG. 10, with the lungs expanded. The section CC is taken near the lower end of the lungs with the lungs contracted. Section DD is taken on the same plane with the lungs expanded. In the film strip 113, cross-section AA appears in frame A and cross-section BB appears in frame B. After a break in the film strip representing the intervening sections, the sections CC and DD appear in the frames C and D.

Note that in both the film strip 111 of FIG. 8 and the film strip 113 of FIG. 11, the cross-sectional views which go to make up the three-dimensional images are alternated. That is to say, a cross-section taken from a closed ventricle is followed by a cross-section on the same plane taken from an open ventricle. This alternation of the views continues throughout the strip.

It is not absolutely necessary to the invention that the arrangement of the frames on the film strip be alternating. Theoretically, any arbitrary arrangement of the two sets of cross-sectional images could be employed. For the purposes of comparing two three-dimensional images, it is convenient to arrange the frames in alternating order. Other arrangements could be used with equal facility providing the frame selection circuitry is coordinated with the order in which the cross-sections are arranged in the film strip.

FIGS. 12–13

These figures illustrate a modification of the invention in which four three-dimensional images are to be successively presented to the viewer. FIGS. 12A, 12B, 12C and 12D show four views of the ventricle 110 varying successively from a completely closed position in FIG. 12A, a partially open position in FIG. 12B, a more widely open position in FIG. 12C and a wide open position in FIG. 12D.

Figure 13:
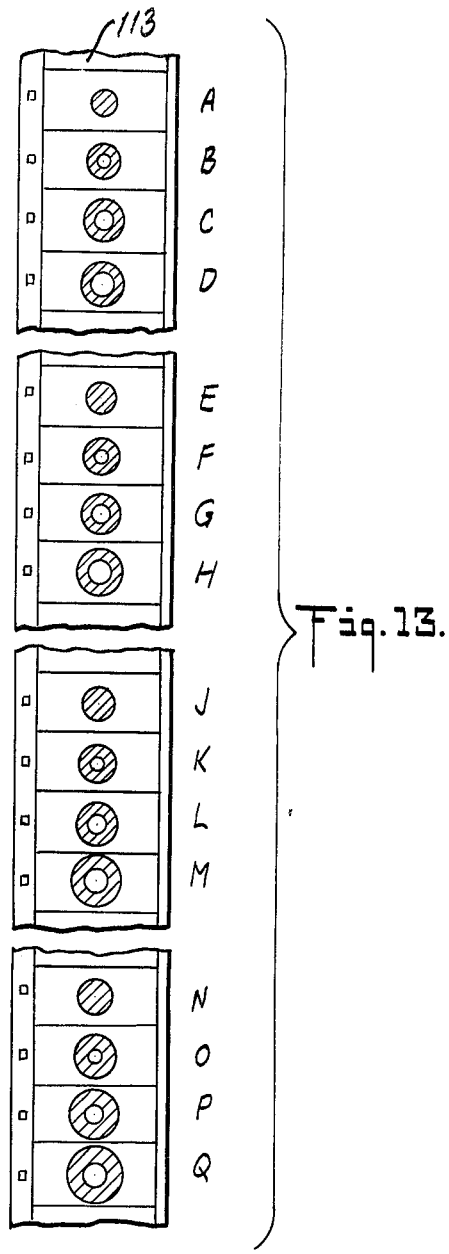
FIG. 13 is a fragmentary view of a film strip showing successive cross-sections on the lettered lines AA to QQ in FIGS. 12A to 12D, arranged in alphabetical order.

FIG. 13 shows the arrangement of cross-sectional views through the ventricle 110 in the four positions of FIGS. 12A–12D as they are assembled in a film strip in accordance with the invention. The sections are identified alphabetically from AA to QQ in FIGS. 12A to 12D. In FIG. 13, each frame is identified by a single letter corresponding to the cross-section from which it was taken in one of FIGS. 12A–12D. In FIG. 13, the sections are arranged sequentially with a section from 12A followed by sections from FIGS. 12B, 12C and 12D on the same plane and appearing in that order. After a break in the film strip which represents cross-sectional views taken on intervening planes not identified by lines in FIGS. 12A–12D, another set of four views appear, again taken in the same order.

When the film strip of FIG. 13 is projected in the apparatus of FIGS. 1–5, four three-dimensional images are successively seen. The duration of each image is controllable, and it is possible to secure approximation of a movement in three-dimensions appearing on the screen.

FIGS. 14–15

FIG. 14 illustrates a fragment of the film strip 33 showing the usual sprocket holes 33a in one margin thereof. A reset aperture 33b is cut in the same margin, extending between two of the sprocket holes. This aperture 33b serves to reset the frame counters in a manner to be described below. The aperture 33b is located in the film strip 33 so that aperture 33b is in the center of the photosensor block 48 (FIG. 4) when the last frame of the film strip 33 passes through the optical path 88. Aligned with the margin of the film strip carrying the sprocket holes 33a and the reset aperture 33b are a pair of lamps 103 and 104 located in photosensor block 48 on the outside of the film holder 34 in its operating position (FIGS. 4–5) and respectively cooperating with photosensors 101 and 102 located in the photosensor block 48 on the inside of the film holder. The photosensors 101 and 102 may be phototransistors whose base leads are left unconnected. They are set apart by a circumferential distance of 1.14 cm. The sprocket hole spacing is 0.76 cm. The aperture 33b is 0.12 cm long.

The strobe trigger control system of FIG. 15 counts the frames in the film strip by counting the holes 33a. It also counts the revolutions of the film holder by counting the apertures 33b. These counts are compared with preset counts established by the setting of manually operated switches 12, 13, 14, 15.

The strobe trigger control system of FIG. 15 is energized by closing the switch 20 having movable contacts 20a and 20b to the position shown in FIG. 15. Switch 20 may be of the push-push type. In this position, contact 20a connects the output of NOR gate 125 to NAND gate 132, which gives control of the strobe trigger 134 to the counter/comparator circuitry; and also, contact 20b serves to supply power to the display indicators 16, 17, 18, 19 (FIG. 1).

The photosensors 101 and 102 respond to the light passing through the sprocket holes 33a and the reset aperture 33b. The outputs of photosensors 101 and 102 are connected to pulse shapers 105 and 106, respectively, so as to produce square wave outputs for the rest of the circuitry. The output from photosensor 101 passes through timing selector 129 (FIG. 16), NAND gate 128, inverter 131, NAND gate 132 and inverter 133 to supply the pulses to the strobe trigger 134. All of the other circuitry shown in FIG. 15 controls and gates these trigger pulses.

The output of photosensor 101 also passes to a decade counter 107 which records the count and converts it from binary to binary-coded-decimal (BCD) form. The BCD output of the counter 107 is transmitted to two comparators 111 and 112. The counter 107 is a units counter and has a tens output line 113 connected to a second decade counter 114 for tens having BCD output lines connected to two comparators 115 and 116. The comparison inputs of the comparators 111, 115, 112, 116 are generated by the four frame selector switches 12, 13, 14 and 15, respectively (see FIG. 1). The switches 12, 13, 14 and 15 control digital numerical displays 16, 17, 18 and 19, respectively. The positions of each of the switches 12, 13, 14 and 15 are translated by BCD converters 121, 122, 123 and 124 respectively, to BCD form and are supplied to the comparison inputs of the comparators 111, 115, 112 and 116, respectively.

When the comparators 111 and 115 reach a count less than or equal to that of their comparison inputs, they transmit a high output signal to one input of NOR circuit 125. This drives the output of NOR 125 low, which locks the trigger output from photosensor 101, via NAND 132, and thus turns off the strobe supply 134. Likewise, when the comparators 112 and 116 reach a count greater than or equal to that of the comparison inputs, they transmit a signal to the second input of the NOR gate 125, which similarly locks the trigger output via NAND gate 132 and turns off strobe supply 134.

The photosensor 101 alone controls the counters 107 and 114, and provides the ultimate trigger pulse to strobe supply 134.

The photosensor 102, while it produces an output pulse in response to each passing sprocket hole, is arranged to rest the counters every time the reset aperture 33b passes it. Since the distance between the sprocket holes 33a is 0.76 cm, and the distance between photosensors 101 and 102 is 1.14 cm, when reset aperture 33b passes photosensors 101 and 102, both will receive light simultaneously. The output of photosensor 102 passes through pulse shaper 106 and is connected to one input of NAND gate 126. The other input of NAND gate 126 is from the output of pulse shaper 105 and hence from photosensor 101. The output of NAND gate 126 is connected to one input of an inverter circuit 135 whose output is connected to reset inputs of the decade counters 107 and 114. Those reset inputs are high when a pulse is received simultaneously by photosensors 101 and 102 (when reset aperture 33b passes) and reset the decade counters to a zero count.

The output of NAND gate 126 is also connected through a wire 127 to one input of NAND gate 128. The other input of NAND gate 128 comes through timing selector 129 from pulse shaper 108, and hence from photosensor 101. NAND gate 128 prevents the transmission of spurious trigger pulses to strobe supply 134 when reset hole 33b passes photosensors 101 and 102.

The output of NAND gate 128 passes through an inverter 131 to one input of NAND gate 132. The output of NOR gate 125 is also connected to another input of NAND gate 132 through element 8a of switch 8. When this input is high at +V potential (either from the +V line or the output of NOR gate 125), control of the trigger pulse is from photosensor 101 and the strobe supply 134 flashes strobe lamp 61 (FIG. 2). When the output of NOR gate 125 goes low, the NAND gate 132 output stays high, and the strobe trigger pulse from photosensor 101 is blocked and does not trigger the strobe lamp 61.

OPERATION OF FIG. 15

Mode 1—Parallel Section Dissector OFF

If the switch 20 is set so that contact 20a is connected to +V and contact 20b is open (not connected or N/C), the NAND gate 132 operates as an inverter for signals from inverter 131. Display lights 16, 17, 18 and 19 are off. The photosensor 101 produces an output pule in response to each sprocket hole 33a, of which there is one for every photographic frame in the film strip 33. These pulses are passed through NAND gate 128 and the NAND gate 132 and trigger the strobe lamp 61 as each frame passes the gate 94. The pulses are also transmitted to decade counter 107. However, in this mode the output of counters 107 and 114 is ignored. The NAND gate 128 is still operative in the circuit and prevents reset hole 33b from generating spurious pulses.

Mode 2—Parallel Section Dissector ON

If decade counters 107 and 114 are reset to zero and switch contact 20a is connected to NOR gate 125 output and switch contact 20b is in the full line position shown, switches 12 and 13 are, for example, set to the number 12, and switches 14 and 15 are set to the number 48, the displays 16, 17, 18 and 19 are ON and read "1", "2", "4" and "8", respectively.

As before, photosensor 101 produces one pulse per passage of hole 33a, which goes to decade counter 107. However, until the decade counters reach the count of 12, the output of comparator 115 is high and the output from comparator 116 is low. The high output from comparator 115 is inverted by NOR gate 125 and this low signal is supplied to one input of NAND gate 132, which blocks the pulses to the strobe trigger control 134 until the count of 12 is reached. At that count, the output from the comparator 115 goes low, and, since the output of comparator 116 is still low, the output of NOR gate 12 is high. Subsequent counting pulses from photosensor 101 provide the NAND gate 132 with the appropriate input pulses and hence trigger the strobe lamp 61 once for every passing frame. The photosensor 101 continues to pulse the strobe light for every passing frame until the comparators 112 and 116 reach the count (48) set into the switches 14 and 15, at which time the output of comparator 116 goes high. The inverted (low) output of NOR gate 125 is transmitted, as before, to one input of NAND gate 132 and thereby blocks the output pulses from that gate from reaching the strobe supply, and thus stops the flashing of strobe lamp 61.

Thus, a selected number of frames at the beginning of the strip can be blanked out by setting the switches 12 and 13, and a selected number of frames at the end of the strip may be blanked out by setting the switches 14 and 15.

Common to Both Modes

The reset aperture 33b is located in the film strip 33 so that it passes photosensor block 48 (FIG. 5), when the end of the film passes the optical path 88 (FIG. 2). When the reset aperture 33b is opposite both photosensors 101 and 102, both photosensors transmit pulses simultaneously to NAND gate 126. NAND gate 126 then transmits an output pulse through the inverter 135 to the reset inputs of counters 107 and 114, resetting both counters to zero. An output pulse is also transmitted directly from NAND gate 126 to NAND gate 128.

The NAND gate 128 functions to block the operation of the strobe light when the reset pulse is received from photosensor 102. The reason for this is that the strobe lamp has a maximum practical operating frequency and the flashing rate corresponding to the set speed of the motor 44 is near that maximum. The presence of an extra trigger pulse at a higher frequency, such as might be created by the reset apertures 33b, might impair the smooth, steady operation of the strobe light.

The film strip 33 commonly has about 90 frames, and the counters have a capacity of 99. It is therefore necessary to reset the counters after each passage of the film strip.

Figure 5:
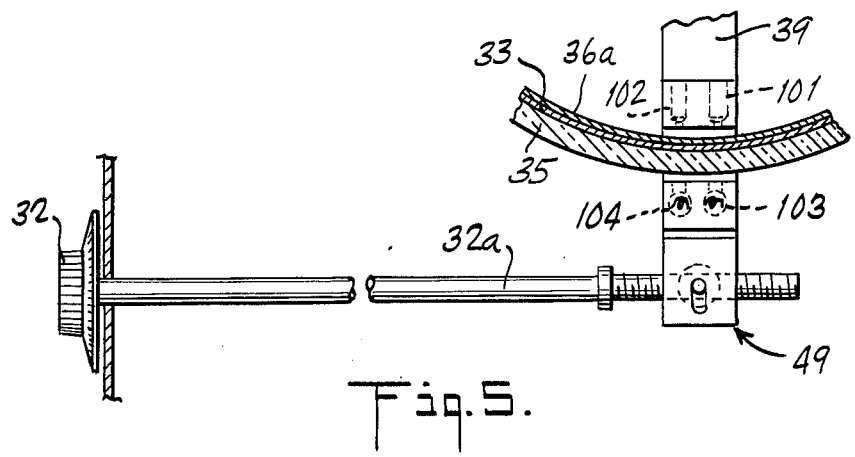
FIG. 5 is a fragmentary cross-sectional view on the line 5—5 of FIG. 4.

The positions of the photosensors 101 and 102 may be adjusted with respect to the film wheel 34 so that the strobe light is energized at the correct instant during the passage of the frame. The mechanism for making this adjustment is illustrated in FIG. 5.

The film holder runs, in one embodiment of the invention, at 2000 rpm, and the projection screen wheel runs at 500 rpm.

FIG. 16

This timing selector circuit has three input terminals identified respectively as 129a, 129b and 129c, and a single output terminal identified as 129d. All the input terminals and the output terminal are connected as shown in FIG. 15.

The sprocket hole counting pulses appear at input terminal 129a. A double pole double throw switch 140 in the position shown connects the input terminal 129a directly through to the output terminal 129b. In that position, the apparatus projects a single three-dimensional picture onto the screen.

In the dotted line position of switch 140, the input pulses from terminal 129a are directed through a divider circuit 141, and thence to the output terminal 129b. When the switch 140 is in the dotted line position, the strobe trigger 134 is pulsed only at alternate frames of the film strip. Capacitors 142 and 144 are connected to the input and output of divider 141 to assist in pulse shaping. The resistor 143 connected to the input of that divider is a loading resistor to prevent the divider from running away when the switch 140 is in the position shown.

Input pulses at terminals 129b and 129c are complementary, representing reset and no-reset conditions. The pulses from terminal 129b count the revolutions of the film wheel 34 and are directed through a divider 145, which divides by two and a divider 146 which divides by ten and thence into a BCD counter 147. The output lines of BCD counter 147 are connected to a comparator 150. The other input lines of the comparator 150 are connected to a manual BCD switch 151, by which the number of revolutions of the film holder are to be counted before switching from one set of frames to the other is established. Comparator 150 produces a pulse on an output line 150a whenever the count from the counter 147 is equal to the count set in the BCD switch 151. The line 150a supplies a reset pulse to the counter 147 and also supplies a pulse through a line 152 and a blocking diode 153, and a manual switch 154 to the input of a flip-flop 155. The $\overline{Q}$ output of flip-flop 155 is connected to one input of a NOR gate 156. The Q output of flip-flop 155 is connected to one input of NOR gate 157. The other inputs of the NOR gates 156 and 157 are supplied from the terminal 129c.

Whichever output Q or $\overline{Q}$ of flip-flop 155 is low when the not-reset signal is received at 129c will make the output of that NOR gate high which will either set or reset the divider 141. These reset or not-reset pulses are refreshed with every revolution of the wheel 134. The set of frames which has been selected for illumination by the stroboscopic lamp is not switched until the equal count pulse is received from the comparator 150. Refreshing the set or reset pulse each revolution of the film holder is desirable to avoid the effect of any possible noise or dirt blocking the sprocket hole and the like which might result in a shift from one set of frames to the other set at and undesired time. By opening the freeze switch 154, the operator can lock the projector so that it displays either set of frames continuously.

FIGS. 17–18

These figures illustrate circuits for controlling the motor 44 and the solenoid 11 which controls the lock 10. These circuits are controlled by the main switch 123 (FIGS. 1 and 18), the door operated switch 8 and a film interlock circuit 160.

The circuit of FIG. 15 supplies a pulse at an output terminal 161 in response to every passing sprocket hole. The pulses at terminal 161 are transmitted to a retriggerable single shot circuit 162 (FIG. 17) whose output line 163 is connected to one input of the film interlock 160.

Referring to FIG. 18, power is supplied from an AC supply line through the main switch 23 to two transformers 164 and 165. The secondary of transformer 164 is connected to a rectifier bridge circuit 166 whose output is connected through a diode 167 to an output terminal 170. The output of bridge 166 is also connected directly to an output terminal 171, where the potential contains a substantial ripple component. The output of transformer 164 is also connected through a pair of silicon controlled rectifiers (SCR's) 172 and 173 whose common output is connected to a terminal 174. The control electrodes of the rectifiers 172 and 173 are connected through a transformer 175 to control input terminals 176 and 177.

Figure 17:
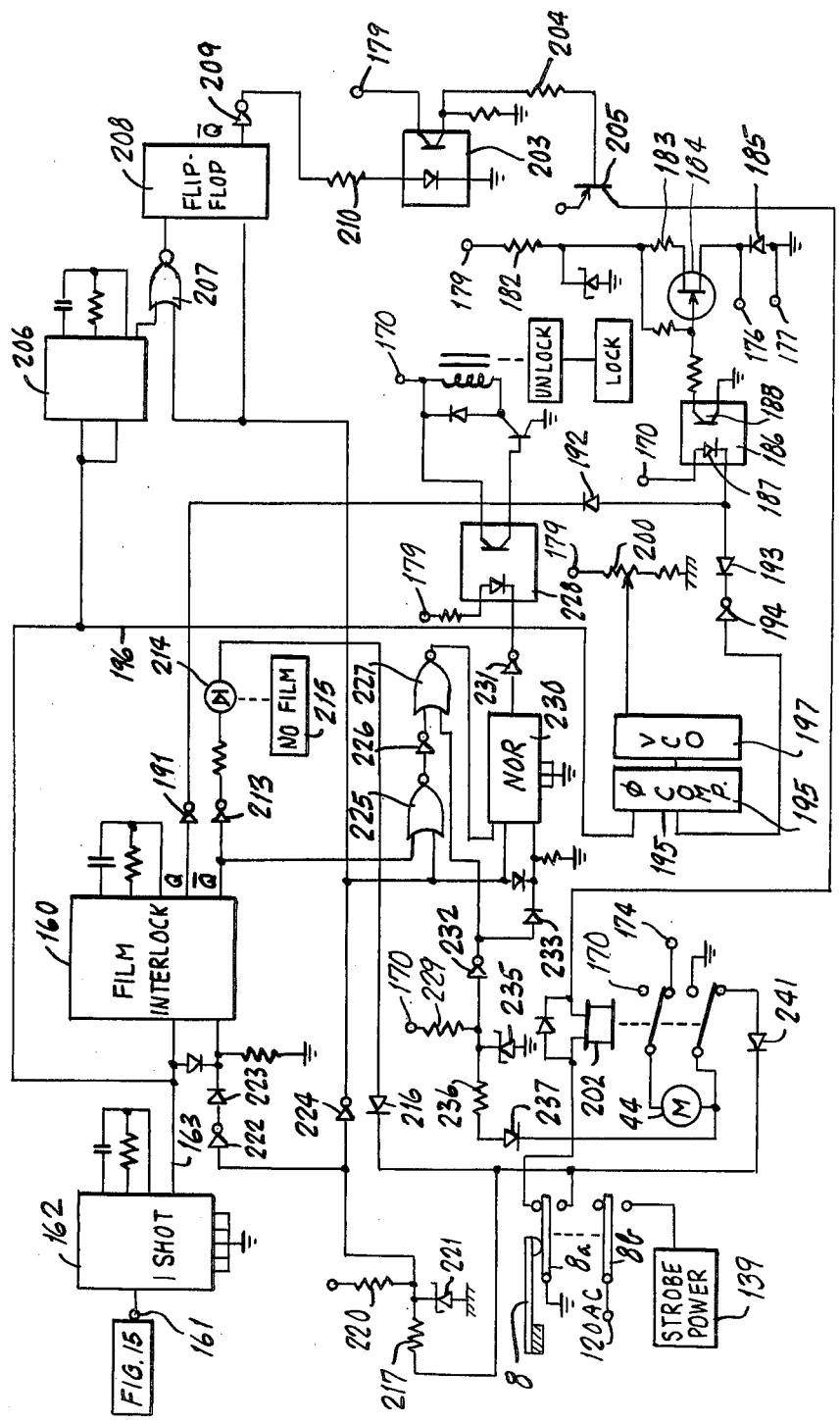
FIG. 17 is a wiring diagram of an interlocking circuit forming a part of the invention.
Figure 16:
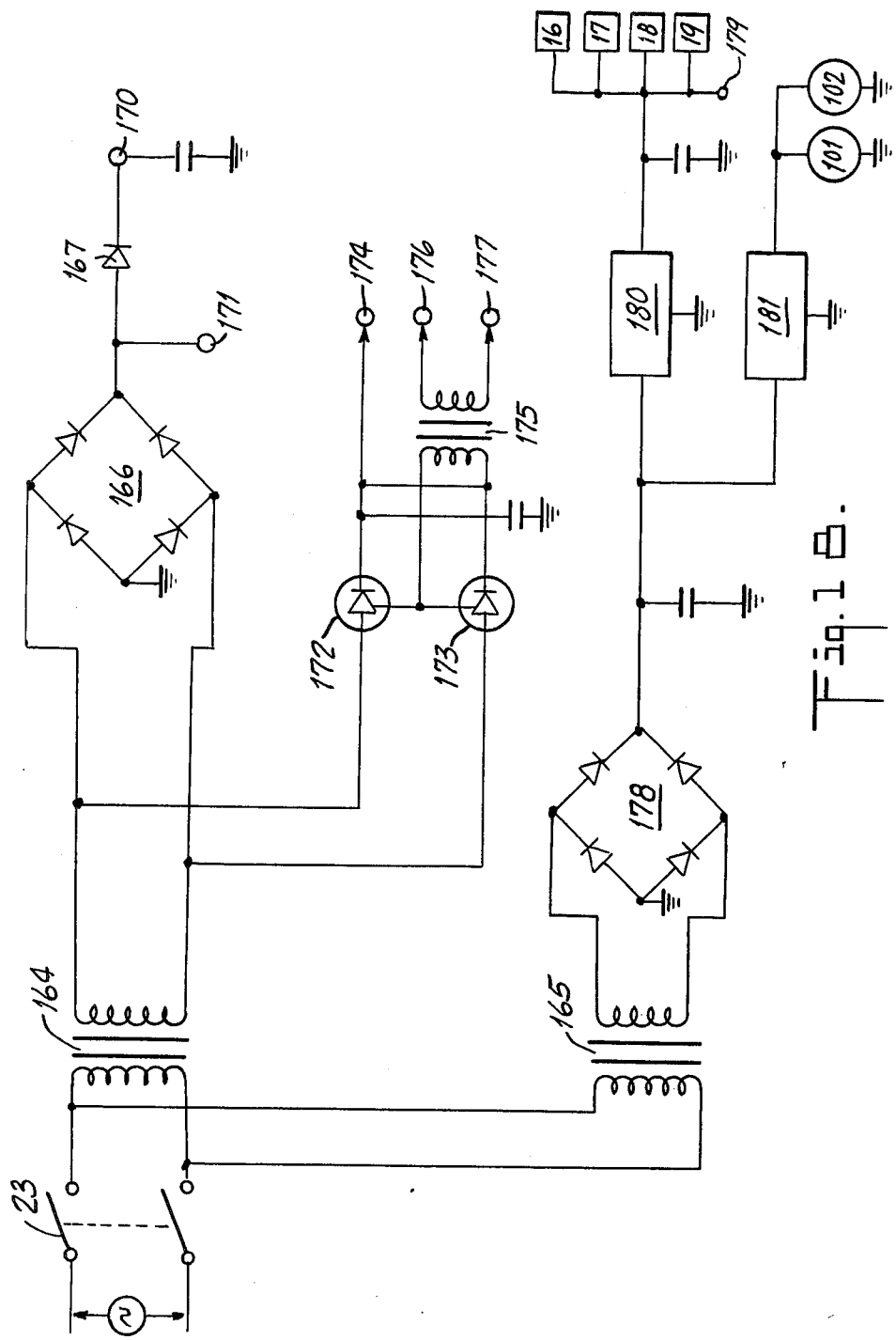

The output of transformer 165 is connected to a rectifier bridge 178 whose output is connected through a voltage regulator 180 to the display lamps 16, 17, 18 and 19, shown in FIG. 1 and to a terminal 179, which also appears at several locations in FIG. 17. The output of bridge 166 is also connected through a voltage regulator 181 to the lamps 101 and 102 which energize the phototransistors 103 and 104.

The power to the motor 44 from output terminal 174 is controlled by signals at the terminals 176 and 177. These signals are controlled by a circuit shown in FIG. 17 which may be traced from power supply terminal 179 through a resistor 182, a resistor 183, a unijunction transistor 184 and diode 185. The terminals 176 and 177 are connected to the opposite terminals of the diode 185. The control electrode of the unijunction transistor 184 is controlled by an optoisolator 186, which is a device having a light producing element 187 such as a light emitting diode (LED) controlling a light sensitive element 188. The signals supplied by the light sensitive element 187 are controlled by the Q output terminal of the film interlock circuit 160, and by the output of a phase comparator 195. The Q output of circuit 160 passes through an inverter 191 and a diode 192 to one terminal of the light producing element 187. The output terminal of phase comparator 195 is connected through an inverter 194 and diode 193 to the same terminal of element 187. One input terminal of the phase comparator 195 is connected through a conductor 196 to the output 163 of the single shot 162. The other input of the phase comparator 195 is connected to a voltage controlled oscillator (VCO) 197. The input of voltage controlled oscillator 197 is connected to the slidable contact of a variable resistor 200 connected between an input terminal 201 and ground.

The circuit described above maintains a constant speed of the motor 44 as determined by the frequency established at the voltage controlled oscillator 197 by the setting of the variable resistor 200.

Under certain dangerous or undesirable operating conditions, motor 44 is removed from the control of the circuit just described and is transferred to a braking circuit in which it is supplied with direct electrical energy of reverse polarity for the purpose of stopping it quickly. The conditions which produce this reverse energization of the motor are the opening of the door to get access to the film holder, or the absence of a film in the film holder.

The door switch 8 is shown in FIG. 17 in the door open position and is movable therefrom to a door closed position. Switch 8 has contacts 8a and 8b. In the door closed position, the contact 8b supplies power to the circuitry 139 of the strobe lamp 61 (FIG. 2) and contact 8a through which one terminal of motor 44 is connected to ground through a diode 241. The circuitry 139 represents the power supply for the stroboscope lamp 61. The flashing of that lamp is determined by the pulses at the stroboscope trigger 134 (FIG. 2). Such circuitry is known in the stroboscope art.

The energizing circuit for relay 202 may be traced from an input terminal 170 through the inlet sensitive element of an optoisolator 203, a resistor 204, a PNP transistor 205 to the winding of relay 202 and thence through contact 8a to ground. The input circuitry of optoisolator 203 is controlled in response to the sprocket hole counting impulses at terminal 161 as represented by the signal on the output line 63 of single shot 162. This signal passes through a retriggerable monostable circuit 206 to one input of a NOR circuit 207, whose output is connected to one input of a flip-flop 208. The $\overline{Q}$ output of flip-flop 208 is connected through an inverter 209 and a resistor 210 to the input of optoisolator 203.

The $\overline{Q}$ output of film interlock 160 is connected through an inverter 213 to a light emitting diode (LED) 214 which illuminates a signal 215 having a "NO FILM" indication. The other terminal of diode 214 is connected through a diode 216 to the door closed contact of switch 8a. That contact is also connected to the common terminal of a resistor 220 and a Zener diode 221. That common terminal is connected through an inverter 222 and a diode 223 to a reset input of film interlock circuit 160. That common terminal is also connected through an inverter 224 to the other input of the NOR circuit 207 and to one input of the flip-flop 208. The $\overline{Q}$ output of film interlock 160 is also connected to one input terminal of a NOR circuit 225, whose output terminal is connected through an inverter 226 to one input of a NOR circuit 227 having an output connected to one input of a three input NOR circuit 228. The output of NOR circuit 230 is connected through an inverter 231 to the input of an optoisolator 228 whose output controls the supply of energy to the solenoid 11 which operates the lock 10 on the door 7 (FIG. 1).

The output of inverter 224 is also connected to the other input of NOR circuit 225. The common junction of a resistor 229 and a Zener diode 235 is connected through an inverter 232 to the other input of NOR circuit 227. The output of inverter 232 is also connected through a diode 233 to a second input of NOR circuit 230. A third input of NOR circuit 230 is connected to the output of inverter 224. The common junction of resistor 229 and Zener diode 235 is also connected through a resistor 236 and a diode 237 to one terminal of the motor 44.

In the absence of any dangerous or undesirable condition, the motor 44 will run at a speed determined by the setting of the variable resistor 200. The silicon controlled rectifiers 172 and 173 are controlled by unijunction transistor 184, which is in turn controlled by the phase locked loop including the phase comparator 195 and the voltage controlled oscillator 197.

When a sprocket hole detection pulse is received at terminal 161, it is repeated by single shot 162 and compared by comparator 195 with a pulse generated by the voltage controlled oscillator 197. If the photocell pulse is leading, the unijunction transistor 184 is turned off to slow the motor 8. If the pulse is lagging, it acts through the optoisolator 186 and unijunction transistor 184 to speed up the motor. Thus, the motor runs at a constant speed set by the resitor 200 which is controlled by the setting of the screw head 199 in FIG. 1.

As long as pulses are received from the sprocket hole counting phototransistors 101 and 102, the single shot 162 holds the Q output of interlock 160 high and the optoisolator 186 remains under the control of the phase comparator 195. If the pulses stop for longer than about 0.75 second, the single shot 162 changes its output state and the interlock 160 acts on the optoissolator 186 to remove power from the motor 44. If the film door is closed, the no-film lamp 215 will also be lighted. Once the NO-FILM indication is lighted, the only way to reset the system and start it again is to open and close the door so as to reset the switch 8. When this is done, the interlock 160 receives a pulse from the microswitch contact 8a and the motor gets a short energization. If no pulse is received from the sprocket hole detectors, the single shot 162 will again cut off the output of interlock 160, and the motor will stop again. If there is film on the wheel with sprocket holes to be detected, this short energization is more than sufficient to start the photocell detecting pulses from the film holder.

When the door is closed, the inverter 224 has a low input and thus a high output. This high output acts to reset the flip-flop 208 and also ensures that the output of NOR gate 207 remains low. The monostable circuit 206 receives the sprocket hole counting pulses from single shot 162. As long as the interval between the sprocket hole pulses is such that the frequency is greater than about 50 Hertz (correspondng to about 5 rpm of the screen), the single shot 162 will continue timing and the output of the monostable circuit 206 will remain high. When flip-flop 208 is in the reset mode, its output is high and the optoisolator 203 remains off and the relay coil 202 which it controls through transistor 205 also remains off. If the door is opened sufficiently to engage the switch 8, contact 8a connects the input of inverter 224 to ground through resistor 217, so that the output of inverter 224 goes low, removing the reset input from the flip-flop 208. The set input also remains low due to the high signal from monostable circuit 206. Thus, when the door starts to open, the motor power is removed by the action of the flip-flop 208. The relay coil 202 is energized and the motor is connected to a reverse polarity circuit. This dynamic braking mode of operation of the motor continues until the monostable circuit 206 changes state, indicating that the motor has slowed the rotating screen to about 5 rpm. Then the NOR circuit 207 output goes low and the set input of the flip-flop 208 goes high, the optoisolator 203 turns on, deenergizing the relay coil and terminating the dynamic braking mode of operation.

The diode 241 is connected in the circuit of motor 44 to prevent the inverter 224 from going into a high state when the door is open by finding a low impedance path through the motor supply filter and capacitor.

The NOR circuit 230 checks three inputs. The input from the interlock 160 goes low when the circuit has stopped generating pulses in response to the sprocket holes for longer than 0.75 seconds. The input from inverter 224 goes low when the film door is opened far enough so that the microswitch 8 is tripped. The signal from inverter 232 goes low when the relay 202 returns to the de-energized condition, indicating that the motor is coasting or stopped. These three signals are negative logic anded by way of the NOR circuit 230. when all three conditions are true, the output of the circuit 230 acts by way of the optoisolator 232 to energize the solenoid 11, and release the lock.

If the single shot 162 should start running through its cycle again, as might happen, for example, when the light beam from the photocell is interrupted, and again completed as the film holder is being removed and replaced, the flip-flop 230 will simply lose its positive set and both the set and reset inputs of that flip-flop will remain low. Thus no change of state will occur and the solenoid will remain energized and the lock will remain unlocked.

Should the door 7 subsequently be closed so that the switch 8 resets to the closed position (the lower position as shown in the drawing), the inverter 224 output will go high and this will remove the set input from the flip-flop 230 and apply a high signal to the reset, thus causing the solenoid to release and relock the door.

The NOR circuit 230 comprises three inputs connected through NOR gates to the input of a flip-flop. In order to trigger the flip-flop, all three inputs of the NOR gate must be in their low condition.

Should there be an error in the relay 202 (e.g., a sticking contact) that causes it to remain in the reverse braking mode, the inverter 224 will never go low and the solenoid 11 will never become energized are release the lock.

If the film holder should be omitted, or the film itself unloaded and never reloaded, the motor will receive an initial supply of power as mentioned previously. During the time that the initial pulse is received by the film interlock circuit 160, the Q output of that circuit will go high preventing the door from opening until power is removed. The door latch solenoid is de-energized and the door is locked at this time. When the film interlock 160 reaches the end of its cycle, the $\overline{Q}$ output will go low and the solenoid 11 will be energized and release the lock. Since the initial energization of the motor is only enough to give the motor a small velocity (less than 5 rpm), there is no hazard if the operator should open the door at this point. Indeed, at that speed, the motor comes to a complete stop within the time it takes the operator to open the door.

In the power supply circuit of FIG. 18, note that the voltage regulators 180 and 181 that supply power to the logic circuit and the photocell energizing lamps operate off a second transformer 165 separate from the motor transformer 164. This prevents any motor noise or current surges from the motor circuit from entering the logic with possible erroneous results.

The apparatus of the invention has other medical uses besides the ones explained in detail above. For example, it can compare past X-ray pictures or other photographs with more recent ones of the same subject. Another example, one view might be taken to emphasize bone structure and a different one to emphasize soft tissue or injected contrast material. It might also be used to compare an overall view with a highly magnified view.

The apparatus also has industrial uses. For example, it might be used to compare a perfect specimen with a new specimen just produced.

Figure 16:
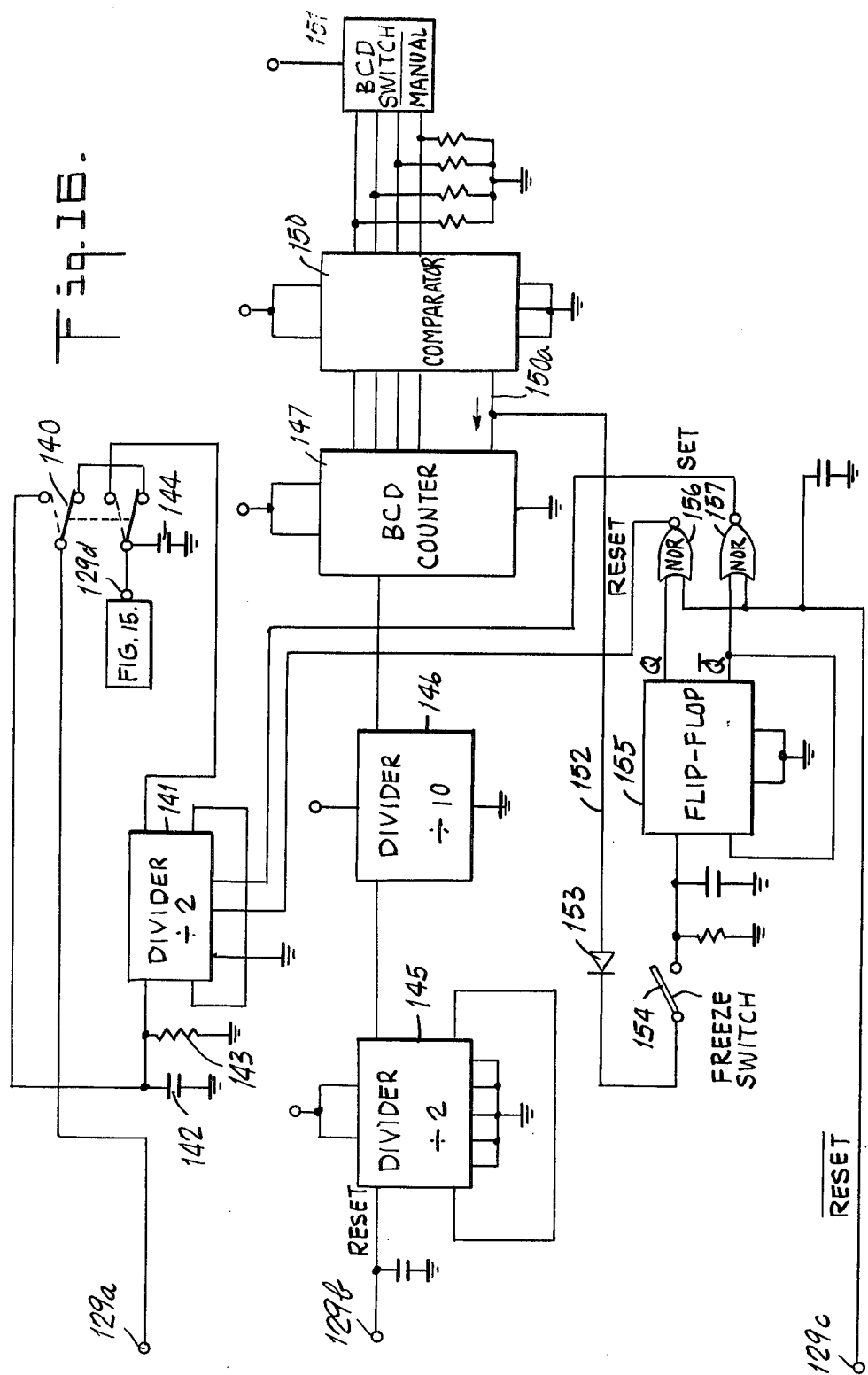
FIG. 16 is a wiring diagram of a timing selector circuit shown in a single box in FIG. 13.

The circuitry described in detail in FIG. 16 is adapted for use with the film strips shown in FIGS. 8 and 11, where only two three-dimensional views are being compared. If it is desired to change to a system for comparing four three-dimensional views as shown in FIGS. 12 and 13, the divide by two circuit 143 would be replaced by a divide by four circuit. A four pulse counter would be inserted in the set line between the NOR circit 157 and the set input of the divide by four circuit.

The invention is not limited to a particular sequence of the sets of pictures in the film strip. For example, the alternating arrangement shown in FIGS. 6–10 for two images being compared could be replaced by an arrangement in which all of the pictures in one set were arranged in sequence and followed by all of the pictures in the other set in sequence. The circuitry would have to be modified to accommodate whatever order is chosen for the presentation of the pictures of the sets.

Figure 19:
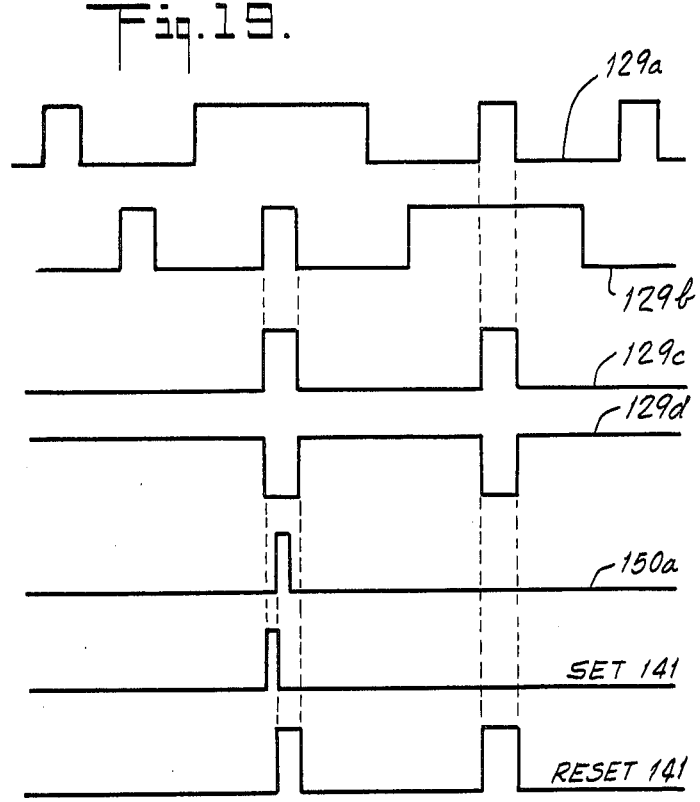
FIG. 19 is a timing diagram relating to FIGS. 15-18.

FIG. 19 is a timing diagram illustrating the wave forms at various points in the circuit of FIG. 16. Each wave form is given the same identifying numeral as that of the location where it appears in FIG. 16. The apparent delay in the line 150a in FIG. 19 represents propagation time, and is somewhat exaggerated for purposes of clarity.

We claim:

1. Apparatus for forming and sequentially displaying in the same space at least two different three-dimensional images, comprising:
   a. intermittently operable illuminating means;
   b. an optical system defining an optical path extending from said illuminating means;
   c. means supporting an array of photographs and operable to move said photographs successively through said optical path at a rate sufficiently greater than the human persistence of vision so that the array moves through the path within the period of perisistence of vision;

d. means for operating said illuminating means only when one of the photographs is aligned with said path;

e. a projection screen circumscribing an axis about which the screen is rotatable, said screen being curved eccentrically with respect to the axis and intercepting said optical path, the curvature of the screen being effective to move the screen along the optical path toward and away from the photographs as the screen rotates;

f. means synchronizing the rotation of the screen with the operation of the illuminating means and the movement of the photograph supporting means to project on the screen a series of images which appear to an observer having persistence of vision to be a three-dimensional image;

wherein the improvement comprises:

g. at least two series of two-dimensional photographs in said array, each series showing successive sections of one of said images, the photographs of each series being arranged in said array in a predetermined order corresponding to the relationship that said successive sections bear to each other, the photographs of each series being located in said array in positions different from the locations of the photographs of the other series; and h. selection means for controlling said illuminating means to illuminate the photographs of only one of said series during one movement of said array through said optical path, and to illuminate the photographs of only another of said series during a subsequent movement of said array through said optical path.

2. Apparatus as in claim 1, including:

a. only two series of photographs in said array, the photographs of one series being located alternately in said array with respect to the photographs of the other series; and b. said selection means is operable to select one or the other of said two series of alternately located photographs.

3. Apparatus as in claim 2, in which said selection means is operable to select one series and then the other alternately at predetermined intervals.

4. Apparatus as in claim 3, in which said two series of photographs show an object having relatively movable parts, with the parts in one position in one series and in a different position in the other series.

5. Apparatus as in claim 1, in which:

a. said photographs are of the same object having at least relatively two movable parts, with the parts shown in a distinctive position in each series; and b. said selection means is operable to display such series sequentially so as to produce on screen a three-dimensional illusion of movement.

6. Apparatus as in claim 1, including means for locking said selection means to display only one of said series continuously.

7. Apparatus as in claim 1, in which said series of two-dimensional photographs are arranged in a film strip.

8. Apparatus for forming and displaying at least one three-dimensional image, comprising:

a. a casing;

b. intermittently operable illuminating means in the casing;

c. an optical system defining an optical path extending from said illuminating means;

d. means within the casing supporting an array of photographs and operable to move the photographs successively through said optical path at a rate sufficiently greater than the human persistence of vision so that the array moves through the path within the period of persistence of vision;

e. drive means in the casing for said supporting means, said supporting means being interchangeably connected to the drive means so that a different supporting means can be substituted with a different array of photographs;

f. a door in the casing for access to the supporting means; and g. lock means to limit movement of the door beyond a safe distance from its closed position when the supporting means is moving at more than a predetermined speed.

9. Apparatus as in claim 8, including speed responsive means for releasing the lock means when the drive means is below said predetermined speed.

10. Apparatus as in claim 8, including:

a. a brake for retarding motion of the drive means; and b. control means operated by movement of the door within said safe distance to apply the brake to the drive means.

11. Apparatus as in claim 10, including:

a. an electric motor in said drive means; and b. means in said brake for energizing the motor for reverse rotation to bring it to a stop quickly.

12. Apparatus as in claim 11, including interlock means to hold the door closed until the power supply is disconnected from the motor.

13. Apparatus as in claim 8, including:

a. an electric motor for operating the driving means; and b. means to disconnect the motor from its source of power if there is no array of photographs on the supporting means.

14. Apparatus as in claim 8, including:

a. means for indicating that there is no array of photographs on the supporting means; and b. interlock means responsive to the absence of an array on the supporting means to activate the indicating means.

* * * * *